Patented Mar. 18, 1952

2,589,209

UNITED STATES PATENT OFFICE 2,589,209

DITHIOCARBAMATE-ALDEHYDE CONDENSATION POLYMERS

Otto Kardos, Leonardo, N. J., assignor to Hanson-Van Winkle-Munning Company, Matawan, N. J., a corporation of New Jersey No Drawing. Application September 4, 1948, Serial No. 47,940

1 Claim. (Cl. 260—72)

This invention relates to new and useful condensation polymers and methods of preparing same.

In accordance with this invention, it has been found that alkylene polyamines, comprising the alkylene diamines and the polyalkylene polyamines, in which part of the amino hydrogen atoms have been substituted by carbodithioic (—CSSH) or alkali metal carbodithioate (—CSSNa, —CSSK) groups and in which thus dithiocarbamic (—NHCSSH) or alkali metal dithiocarbamate (—NHCSSNa, —NHCSSK) groups are formed, are able to react with aldehydes to form condensation polymers. For clarity, the invention will be described with reference to the use of formaldehyde, it being understood that various other aldehydes such as acetaldehyde, aldol, glyoxal and furfural may be used in similar manner. Two types of such condensation polymers were prepared. Condensation polymers of type I were prepared by reaction of dithiocarbamic acids of alkylene polyamines (which are presumably present in the form of intra- or intermolecular amine salts) with formaldehyde. Condensation polymers of type II were prepared by reaction of the alkali metal dithiocarbamates of alkylene polyamines with formaldehyde. Excess alkali metal hydroxide may be present in this case.

Condensation polymers of type I are not soluble in water and only slightly, if at all, soluble in aqueous alkali metal hydroxide. The properties of these resins vary with the kind of polyamine used. In the case of the monodithiocarbamic acid of hexamethylenediamine (precipitated from alcoholic solution with 1 mol carbon disulphide per mol diamine), a white, hard, thermoplastic resin resulted on slight heating with formaldehyde. From triethylenetetramine a soft, red-orange colored resin was obtained.

Condensation polymers of type II are obtained in the form of water-soluble yellow to orange syrups or gels, which can be vacuum dried and powdered. In condensation polymers of this type, the dithiocarbamate groups are apparently not transformed during the resinification process, as indicated by the water solubility of these polymers and by the fact that they can be precipitated from their aqueous solutions by addition of aqueous solutions of zinc, cadmium or lead salts or by addition of moderately strong acids. These polymers are thus polydithiocarbamates.

The following is suggested by way of example as a possible formula of condensation polymers of type II for a polymer prepared from 1 mol triethylenetetramine, 2 mols carbon disulphide, 2 mols sodium hydroxide and 2 mols formaldehyde:

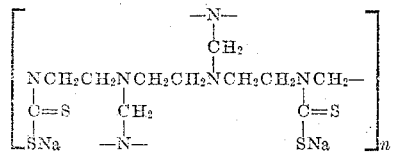

Condensation polymers of type I may find use for plastics and other purposes. Condensation polymers of type II have been found to be very effective "brighteners" for cyanide zinc plating solutions.

The presence of dithiocarbamic groups in a polymer substance suggests other possible uses such as in the field of vulcanization accelerators, flotation agents, insecticides, ion exchange resins, etc.

From the theory of polymerization, it can be predicted that substituted alkylene polyamines must be at least difunctional in order to form linear condensation polymers, and at least trifunctional in order to form cross-linked polymers with formaldehyde. It can also be predicted that in certain cases, especially when the formation of five and six-membered rings is possible, ring formation may occur besides or instead of polymer formation. Ring formation seemed to occur preferentially on reaction of the dithiocarbamic acids or the alkali metal dithiocarbamates of ethylenediamine or 1,2-propylenediamine, whereas polymer formation occurred preferentially with the polyethylene and polypropylene polyamines and the higher alkylene diamines from tetramethylenediamine (1,4-diaminobutane) on.

Dithiocarbamic acids of the alkylene polyamines can be precipitated from alcoholic solutions of the polyamines by addition of carbon disulphide with stirring and cooling. These precipitates contain approximately one dithiocarbamic group per molecule polyamine. Precipitates have also been obtained from solutions of the polyamines in other solvents such as e. g. in butycellosolve or tetrahydrofurfurylalcohol. In the latter case, the precipitation must be completed by final addition of water.

The alkalidithiocarbamates can be obtained by dissolving the dithiocarbamic acids in alkali metal hydroxide or by slow addition of carbon disulphide under stirring and cooling to a mixture comprising the alkylene polyamine and a concentrated aqueous alkalihydroxide solution (e. g. 50% by weight NaOH). Up to two dithiocarbamate groups per mol polyamine can be introduced by this latter method.

CONDENSATION POLYMERS OF TYPE I

Example 1

29 g. (0.25 mols) of hexamethylenediamine were liquefied by slight heating and dissolved in 300 g. ethanol.

19 g. (0.25 mols) of carbon disulphide were slowly added under stirring and cooling.

A white powdery precipitate resulted which was filtered through a Buchner funnel. To this precipitate, still containing some ethanol, were added 40.5 g. (½ mol) of formaldehyde (37%). A white slurry resulted. On heating of this slurry on a water bath to about 55° to 60° C., a white resinous lump separated from the liquid phase. On cooling to room temperature, the resin becomes hard and can be powdered. This white resin is thermoplastic. It softens considerably between 80° and 120° C. It is insoluble in water and to a large extent insoluble in aqueous alkali metal hydroxide, although it seems to disintegrate on prolonged boiling in alkali metal hydroxide.

A similar resin prepared from triethylenetetramine as starting material was soft and red orange. I was not able to prepare a similar resin from 1,2-propylenediamine.

The separation of a resinous mass does not occur in absence of formaldehyde. When the dithiocarbamic acid was heated with water alone to 65° C., no separation occurred. However, on addition of formaldehyde, the resin separated at once. In order to obtain a smooth reaction, enough ethanol (e. g. 160 g. per 0.25 mols hexamethylenediamine) or ethanol plus water (e. g. 60 g. ethanol plus 100 g. water) must be present in the reaction mixture.

CONDENSATION POLYMERS OF TYPE II

Depending on the functionality of the polyamine, the molecular proportion of formaldehyde used, the reaction temperature and the reaction time, either syrupy or gelatinous reaction products are obtained.

These syrups and gels can be (a) Used as such or in aqueous solution;
(b) Vacuum dried and pulverized;
(c) Dissolved in water and precipitated by addition of aqueous solutions of suitable heavy metal salts (e. g. zinc, cadmium, lead salts);
One half mol of zinc sulphate per mol of carbon disulphide introduced is necessary to precipitate these polymers plus evidently the amount necessary to neutralize an excess of alkali hydroxide.
(d) Dissolved in water and precipitated by addition of dilute acids (sulphuric, hydrochloric, acetic acid).

Thus the condensation polymers of type II can be obtained in the form of alkali metal dithiocarbamates, heavy metal dithiocarbamates or dithiocarbamic acids.

Condensation polymers prepared with only 0.25 or less mols carbon disulphide per mol polyamine could not be precipitated in the form of zinc salts.

Example 2

To 146.2 g. (1 mol) triethylenetetramine and 160.0 g. (equivalent to 2 mols NaOH) aqueous sodium hydroxide solution (50% by weight) 152.3 g. (2 mols) carbon disulphide were added, drop by drop, under mechanical stirring and cooling, the lower end of the dropping funnel dipping into the (upper) polyamine layer. The stirring was continued for some time after the last drop of carbon disulphide had been added. To the homogeneous syrupy reaction product 101 g. (1.25 mols) formaldehyde (37% by weight) were added under stirring and moderate cooling. Heat evolution occurred.

The syrupy condensation polymer was heated for a short time at about 70° C. and then diluted with water to 1 liter, forming a light yellow solution. This solution, when added in an amount of 0.6 to 6 ml./l. to a cyanide zinc plating solution made up from 6 to 12 oz./gal. (e. g. 8 oz./gal.) zinc cyanide, 3 to 9 oz./gal. (e. g. 5.75) sodium cyanide, 8 to 12 oz./gal. (e. g. 10.5 oz./gal.) of sodium hydroxide, gave bright electrodeposits in still and barrel plating.

The resin may be precipitated from its aqueous solutions by addition of slightly more than 1 mol zinc sulphate (in aqueous solution) or by addition of dilute acids such as hydrochloric, sulphuric, acetic acid. These precipitates can be washed, vacuum dried and pulverized to slightly yellowish white powders.

On use of 2 mols formaldehyde and, if necessary, slight heating, yellow to orange gels could be obtained.

Example 3

To 146.2 g. (1 mol) triethylenetetramine and 30.0 g. (equivalent to 1 mol NaOH) aqueous sodium hydroxide solution (50% by weight) were added 76.1 g. (1 mol) carbon disulphide and then 162 g. (2 mols) formaldehyde (37%) under stirring and cooling.

A yellow-orange gel formed which was dissolved in warm water. To this solution, a solution of somewhat more than 144 g. (½ mol) of zinc sulphate (ZnSO$_4$.7H$_2$O) was added under stirring and the powdery precipitate washed, filtered and vacuum dried. 0.05 to 0.2 g./l. of this product when dissolved in a cyanide zinc plating solution increased the brightness of the electrodeposits considerably.

By reacting 1 mol triethylenetetramine first with 0.25 mol carbon disulphide and sodium hydroxide and then with 2.5 mols formaldehyde, a water-soluble gel was obtained which acted as an effective brightener in cyanide zinc plating solutions but could not be precipitated from its aqueous solution by addition of a zinc sulphate solution.

Condensation polymers similar to those described above could be obtained from diethylenetriamine, triethylenetetramine, tetraethylenepentamine and dipropylenetriamine as starting materials. Syrups were also obtained from the monosodium dithiocarbamate of tetramethylenediamine, or hexamethylenediamine and formaldehyde.

When acetaldehyde, aldol, glyoxal or furfural was used instead of formaldehyde, darker colored products resulted, which were also effective as zinc brighteners.

The use of the herein described polymerization products as brighteners for cyanide zinc plating solutions is the joint invention of myself and Myron B. Diggin, Serial No. 240,780, filed August 7, 1951.

I claim:

A condensation polymer comprising the reaction product of an aldehyde selected from the group consisting of formaldehyde, acetaldehyde, aldol, glyoxal and furfural, with an alkali metal dithiocarbamate of an alkylene polyamine selected from the group consisting of the alkylene diamines containing a straight chain of at least four carbon atoms between the amino groups and the polyalkylene polyamines containing straight chains of at least two carbon atoms between every two amino groups.

OTTO KARDOS.

REFERENCES CITED

The following references are of record in the file of this patent:

UNITED STATES PATENTS

| Number | Name | Date |
|---|---|---|
| 1,975,588 | Powers | Oct. 2, 1934 |
| 2,313,871 | Hanford | Mar. 16, 1943 |
| 2,356,764 | Kern | Aug. 29, 1944 |
| 2,359,374 | Lichty | Oct. 3, 1944 |
| 2,457,209 | Clark | Dec. 28, 1948 |